US008943939B2

(12) United States Patent
Demand

(10) Patent No.: US 8,943,939 B2
(45) Date of Patent: Feb. 3, 2015

(54) DIE CUTTING DEVICE WITH ADJUSTABLE CYLINDER DISTANCE

(75) Inventor: Thomas Demand, Wetzlar (DE)

(73) Assignee: Gallus Druckmaschinen AG, Langgoens-Oberkleen (DE)

( * ) Notice: Subject to any disclaimer, the term of this patent is extended or adjusted under 35 U.S.C. 154(b) by 300 days.

(21) Appl. No.: 13/557,599

(22) Filed: Jul. 25, 2012

(65) Prior Publication Data

US 2013/0025426 A1 Jan. 31, 2013

(30) Foreign Application Priority Data

Jul. 25, 2011 (DE) ..................... 10 2011 108 505 U

(51) Int. Cl.
*B23D 25/12* (2006.01)

(52) U.S. Cl.
USPC ................................. 83/337; 83/561; 83/659

(58) Field of Classification Search
USPC ............ 83/344–348, 561, 563, 659, 663, 665
See application file for complete search history.

(56) References Cited

U.S. PATENT DOCUMENTS

| | | | | |
|---|---|---|---|---|
| 3,691,810 | A * | 9/1972 | Tadeusz | 72/234 |
| 3,744,361 | A * | 7/1973 | Van Doorn et al. | 83/37 |
| 4,205,596 | A * | 6/1980 | Chesnut | 493/370 |
| 4,359,919 | A | 11/1982 | Fuchs et al. | |
| 4,372,327 | A * | 2/1983 | Dyett et al. | 131/95 |
| 4,726,804 | A * | 2/1988 | Stitcher | 493/223 |
| 4,770,078 | A * | 9/1988 | Gautier | 83/344 |
| 5,001,950 | A * | 3/1991 | Fokos et al. | 83/37 |
| 5,083,488 | A * | 1/1992 | Stanley et al. | 83/344 |
| 5,156,076 | A * | 10/1992 | Rosemann | 83/344 |
| 5,174,185 | A * | 12/1992 | Aichele | 83/346 |
| 5,388,490 | A * | 2/1995 | Buck | 83/880 |
| 5,598,758 | A * | 2/1997 | Chmelar | 83/100 |
| 5,673,603 | A * | 10/1997 | Aichele | 83/344 |
| 7,600,454 | B2 * | 10/2009 | Kempski et al. | 83/13 |
| 2006/0225546 | A1 * | 10/2006 | Kempski et al. | 83/13 |

FOREIGN PATENT DOCUMENTS

| | | | |
|---|---|---|---|
| DE | 66 02 393 | U | 5/1969 |
| DE | 6602393 | U | 5/1969 |
| DE | 297 15 037 | U1 | 11/1997 |
| DE | 29715037 | U1 | 11/1997 |
| DE | 198 14 009 | C1 | 6/1999 |
| DE | 10 2006 016 266 | B3 | 6/2007 |
| DE | 20 2009 012 625 | U1 | 12/2009 |
| DE | 202009012625 | U1 | 12/2009 |
| EP | 0 899 068 | A2 | 3/1999 |

OTHER PUBLICATIONS

German Patent and Trademark Office Search Report, Dated February 15, 2012.

* cited by examiner

*Primary Examiner* — Sean Michalski
(74) *Attorney, Agent, or Firm* — Laurence A. Greenberg; Werner H. Stemer; Ralph E. Locher

(57) ABSTRACT

A die-cutting device for die-cutting labels includes a die-cutting cylinder and a counterpressure cylinder. A distance between the die-cutting cylinder and the counterpressure cylinder is adjustable. Accordingly, the die-cutting cylinder is locked in position by a locking force and the counterpressure cylinder is displaceably supported by a guide. The locking force and the guide generally form a right angle. A narrow-web printing press includes such a die-cutting device.

12 Claims, 4 Drawing Sheets

DIE CUTTING DEVICE WITH ADJUSTABLE CYLINDER DISTANCE

CROSS-REFERENCE TO RELATED APPLICATION

This application claims the priority, under 35 U.S.C. §119, of German application DE 10 2011 108 505.3, filed Jul. 25, 2011; the prior application is herewith incorporated by reference in its entirety.

BACKGROUND OF THE INVENTION

Field of the Invention

The invention relates to a die-cutting device and to a narrow-web printing press.

Devices for die-cutting flat multi-layered products using a die-cutting cylinder and a counter-pressure cylinder are known in the art. In such devices, at least one layer of the flat multi-layered product can be die-cut without severing all layers completely in a die-cutting nip formed between the die-cutting cylinder and the counter-pressure cylinder. The width of the die-cutting nip is adjustable.

In the present description the term "to die-cut" is understood to include both die-cutting in the narrower sense of "severing", "perforating", or "punching" and in the broader sense of "embossing", i. e. "deform" or "impress". The same applies to similar grammatical constructions such as "die-cuttable", which is to be understood as "severable", "perforatable", or "punchable" in the narrower sense of the word, as well as "embossable", "deformable", or "impressable" in the broader sense of the word. The exclusive use of the term "die-cut" and its grammatical derivations is intended to simplify the description but not to exclude the connotations indicated above or to limit the description in any way. Moreover, in the following description, the terms "die-cutter", "die-cutting device", and "die-cutting machine" will be used synonymously.

When flat multi-layered goods such as self-adhesive labels are to be die-cut, in particular in a die-cutting device in a printing press, an upper material, i.e. a printing material located on the top (the actual label material) and an adhesive layer need to be die-cut (in particular severed) without harming (in particular severing) a release layer that is underneath. The die-cutting process depends on the material to be processed, i.e. the device, especially the positions of its components or the die-cutting depth, needs to be modified or adjusted to be able to adjust the die-cutting depth in a range between a few micrometers and some tenths of a millimeter. Usually the die-cutting is done in a rotary die-cutter (rotary die-cutting unit) or a rotary embosser (rotary embossing unit): In a die-cutting nip formed between a die-cutting cylinder that carries a cutting die or an embossing plate and a counterpressure cylinder, the cutting die or embossing plate acts upon the flat multi-layered good which is plastically changed, for instance severed or embossed. The flat multi-layered good may in particular be web-shaped.

German utility model DE 6602393 U discloses that the die-cutting cylinder and the counterpressure cylinder of a die-cutting device may be equipped with bearer rings that roll on each other so the die-cutting cylinder and the counterpressure cylinder support each other. The adjustability of the die-cutting nip and thus of the cutting depth is achieved by varying the contact pressure, which may result in considerable deformation of the bearer rings. In the die-cutting process, high pressure peaks may occur and may cause a temporary deformation of the die-cutting frame which supports the bearings. If the width of the die-cutting nip changes due to this deformation, the quality of the die-cutting operation will deteriorate. A preloading of the bearer rings at a high contact pressure causes premature wear to bearer rings, rolling surfaces, and bearings.

A disadvantage of such a solution is, however, that the level of the blades of a cutting die or embossing plate received on the die-cutting cylinder must be chosen to match the size of the bearer rings and the height of the release material. In other words, a specific cutting tool adapted to the specific job and to the specific die-cutting device to be used must be created for each job.

Alternatively, German utility model DE 297 15 037 U1 discloses mechanical fine adjustment using conical rollers mounted to the axes of the die-cutting cylinders and counter-pressure cylinders. The conical rollers engage each other in such a way that at least one of the axes is radially and axially displaceable relative to the other in a simultaneous or correlated manner to vary the width of the die-cutting nip.

U.S. Pat. No. 4,359,919 discloses to provide further bearings for the die-cutting cylinder and the counterpressure cylinder which support each other on contact surfaces in an intermediate piece. A contact surface of one of the two bearings supporting each other is configured to be inclined and a wedge-shaped element is provided between the contact surfaces to vary the thickness of the intermediate piece by varying the position of the wedge-shaped element.

Further mechanical fine adjustments are known in the prior art to adjust the cutting nip in the micrometer range. Such a mechanical fine-adjustment is typically achieved using eccentrically adjustable bearer rings. Such a device is disclosed, for instance, in published, European patent application EP 0 899 068 A2 and German patent DE 198 14 009 C1.

Further die-cutting devices are disclosed in patent German patents/applications DE 10 2005 016 779 A1, DE 10 2007 062 936 A1, DE 10 2005 060 587 A1, DE 10 2007 057 188 A1, DE 10 2004 033 032 A1, and DE 29 12 458 OS (corresponding to U.S. Pat. No. 4,359,919).

A disadvantage of the known die-cutters that allow adjustment of the distance between die-cutting cylinder and counterpressure cylinder is that only short adjustment paths are possible. It is not possible to space the cylinders far enough apart to adjust the cutting register. Another disadvantage is that to transfer forces, mechanical components such as highly durable bearer rings that require complex treatment need to be used.

SUMMARY OF THE INVENTION

An object of the invention is to provide a die-cutting device that allows easy and accurate adjustment of the distance between die-cutting cylinder and counterpressure cylinder, thus at least reducing the disadvantages of the prior art, and to provide a narrow-web printing press that includes such a device.

In accordance with the invention, a die-cutting device, which may in particular be used to die-cut or punch labels, includes a die-cutting cylinder rotatable about an axis of rotation and a counterpressure cylinder rotatable about an axis of rotation. The axes of rotation of the die-cutting and counterpressure cylinders are generally parallel. The distance between the die-cutting cylinder and counterpressure cylinder is adjustable. In accordance with the invention, the die-cutting cylinder is locked to be stationary by a locking force; in other words, the die-cutting cylinder is fixed in position due to the effect of a locking force. The counterpressure cylinder is displaceably supported in a guide. Thus the position of the die-cutting cylinder can be changed relative to the position of the die-cutting cylinder. In accordance with the invention, the die-cutting device is configured in a way that the locking force and the guide in the die-cutting device form a right angle. An advantage of this construction is that high die-cutting forces can be generated since the forces may be transferred to the housing of the die-cutting device by the horizontal guide of the counterpressure cylinder and finally to the foundation of the die-cutting device. Another advantage is that bearer rings or support shafts for the transfer of forces can be dispensed with, which means that the die-cutting device can be of simpler construction.

In accordance with an advantageous further development of the die-cutting device of the invention, the die-cutting cylinder is likewise supported in a guide and the guides of counterpressure cylinder and die-cutting cylinder essentially form a right angle.

In accordance with a particularly advantageous and thus preferred embodiment, the guide of the counterpressure cylinder is embodied as a horizontal guide. The guide of the die-cutting cylinder may be embodied as a vertical guide. Such an alignment of the guides is preferred as it permits a short web travel, thus reducing waste during set-up of the device. Horizontal is understood to be essentially parallel to the base and footprint of the device; vertical is the direction perpendicular thereto.

In accordance with a further development of the device of the invention, at least one of the guides includes guide rails, for instance in the shape of guide grooves, for guiding the bearings of die-cutting cylinder and counterpressure cylinder, which bearings may be bearing blocks with radial bearings.

In accordance with an advantageous further development of the die-cutting device of the invention, the die-cutting device includes at least one drive for displacing the counterpressure cylinder in its guide. In accordance with an advantageous further development, one drive may be embodied as a drive for fine-adjustment or for a quick-acting disengagement of the counterpressure cylinder, or a drive may be embodied as a drive for adjusting the register of die-cutting cylinder and counterpressure cylinder. In this context, a quick-acting disengagement of the impression cylinder is understood to mean a quick stop of operation of the cylinders, for instance in case of an emergency stop. The drives may be a number of drives or one and the same drive. During a displacement of the counterpressure cylinder, the die-cutting force may advantageously be maintained.

The invention also relates to a narrow-web printing press, in particular a label printing press, including a die-cutting device configured as described above.

In any combination, the invention described above and the advantageous further developments described above represent advantageous further developments of the invention.

Other features which are considered as characteristic for the invention are set forth in the appended claims.

Although the invention is illustrated and described herein as embodied in a die-cutting device with an adjustable cylinder distance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
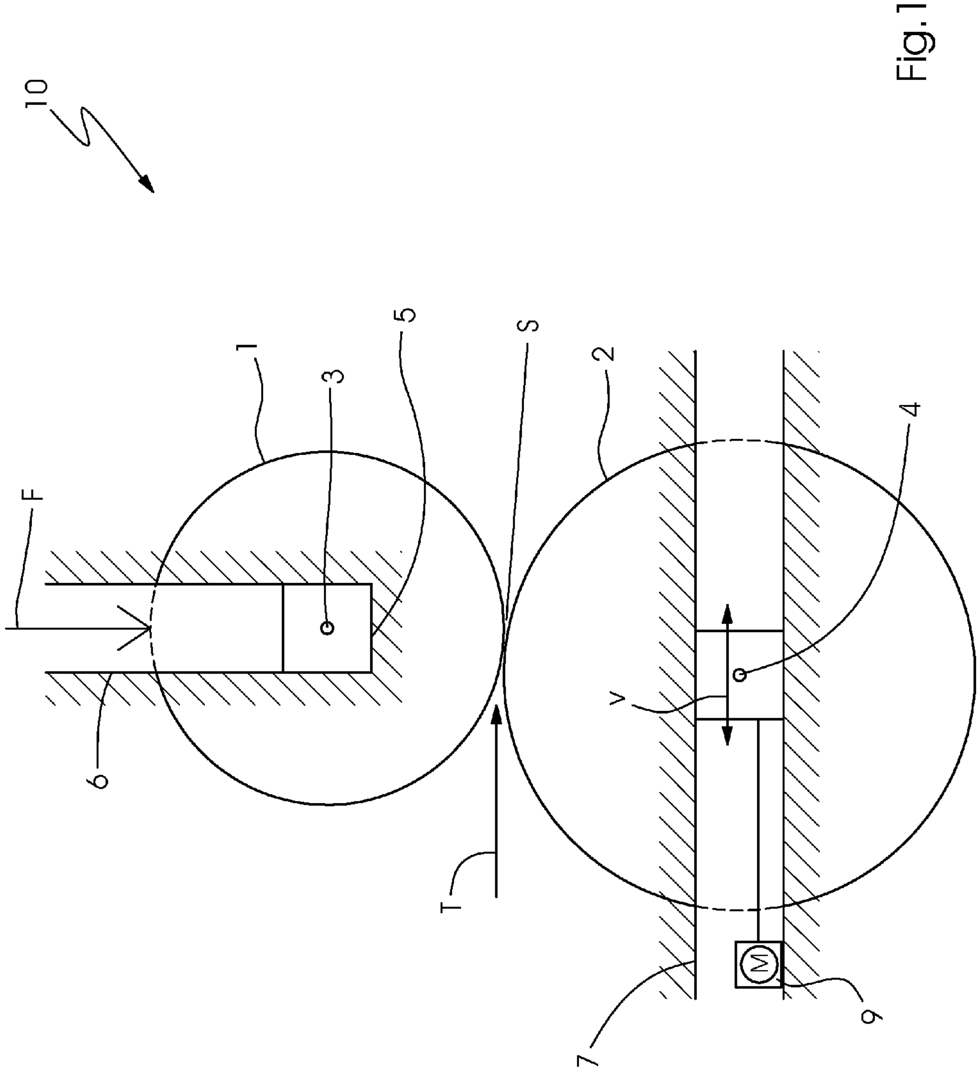
FIG. 1 is an illustration of a first embodiment of a die-cutting device according to the invention.

Referring now to the figures of the drawing in detail and first, particularly, to FIG. 1 thereof, there is shown a first embodiment of a die-cutting device 10 of the invention. The die-cutting device 10 includes a die-cutting cylinder 1 and a counterpressure cylinder 2. The two cylinders 1, 2 cooperate as tools to treat a web-shaped material 144 transported in a direction of travel T. A gap S is formed between the die-cutting cylinder 1 and the counterpressure cylinder 2; that is to say the die-cutting cylinder 1 and the counterpressure cylinder 2 are spaced apart from each other. To modify the effect of the die-cutting cylinder 1 on the web-shaped material 144 to be processed, the distance between the cylinders 1, 2, i.e. the gap S, can be changed. For this purpose, the counterpressure cylinder 2 is displaceably supported in a guide 7 as illustrated by the double-headed arrow v. The counterpressure cylinder 2 may be moved in the horizontal direction along the guide 7. This displacement may be made by hand or by a drive 9 as shown in the embodiment of FIG. 1. The die-cutting cylinder 1 is likewise supported in a guide 6 and is held in position by a locking force F. The guide 6 or rather locking force F and the guide 7 are perpendicular to each other. Due to this arrangement, high die-cutting forces can be generated, which may then be transferred to the non-illustrated side walls of the die-cutting device 10 and to a foundation of the die-cutting device 10 via the horizontal guide 7.

Figure 3:
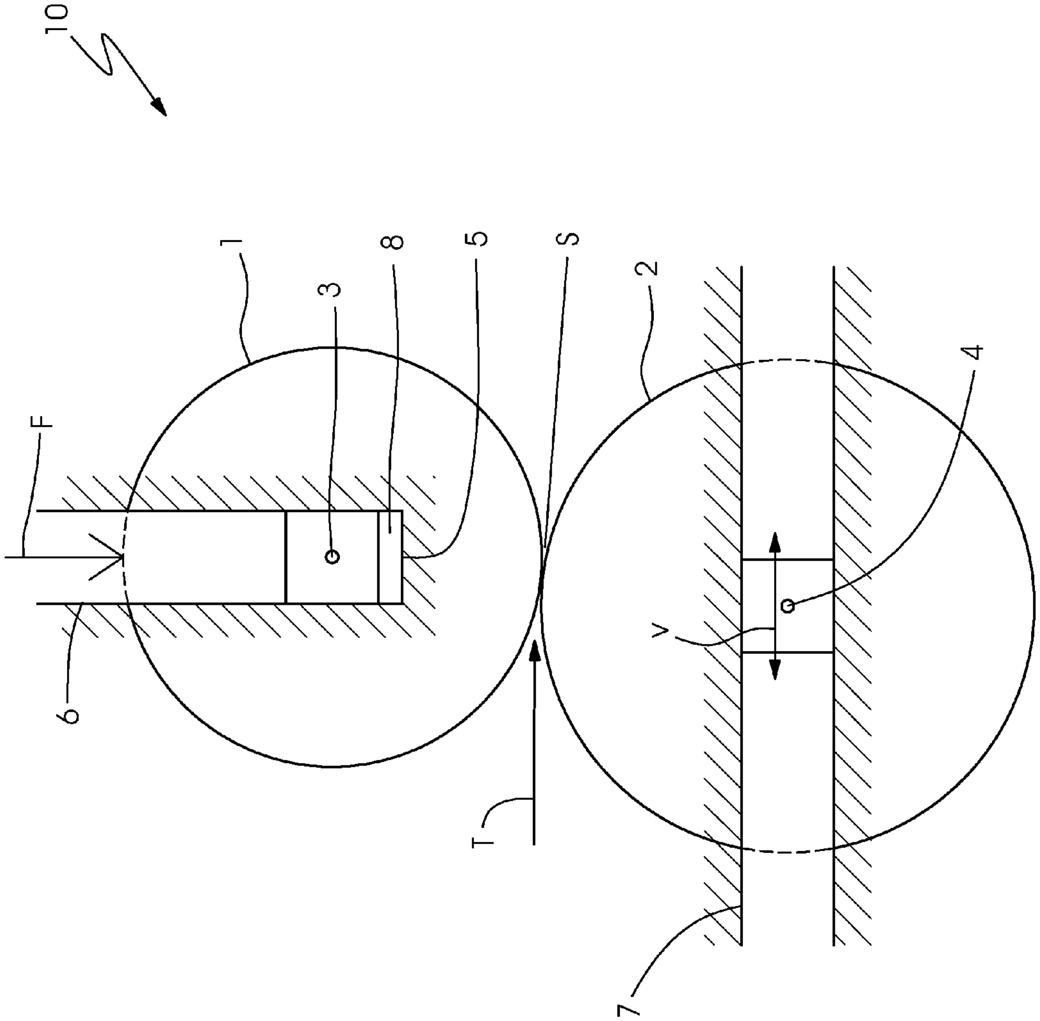
FIG. 3 is an illustration of a further development of the die-cutting device shown in FIG. 1.

FIG. 3 illustrates a further development of the die-cutting unit 10 shown in FIG. 1. Compared to the one in the die-cutting device 10 of FIG. 1, the die-cutting cylinder 1 of FIG. 3 has a larger diameter. As a result, an axis of rotation 3 of the die-cutting cylinder needs to be displaced to create a gap S of desired width. This is done by inserting a shim 8 into the guide 6 of the die-cutting cylinder between a stop 5 of the guide 6 and the bearing of the die-cutting cylinder 1. The shim 8 acts to compensate for the diameters.

Figure 2:
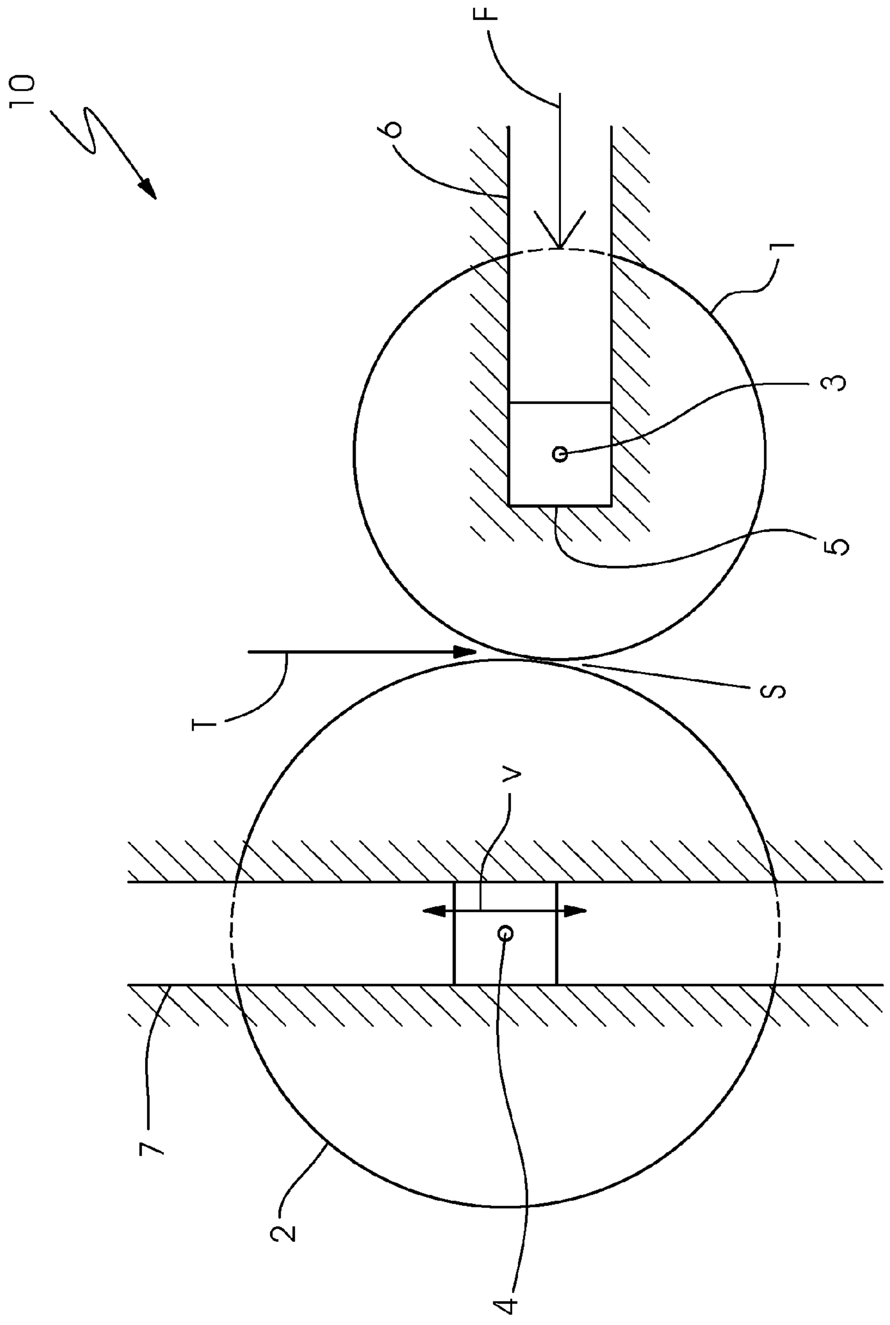
FIG. 2 is an illustration of a second embodiment of the die-cutting device according to the invention.

FIG. 2 illustrates an alternative embodiment of the die-cutting unit 10. Compared to the embodiment described above, the cylinder guides 6, 7 have been rotated through a 90° angle. The result is a generally vertical direction of travel of the web-shaped material 144 between the die-cutting cylinder 1 and the impression cylinder 2.

Figure 4:
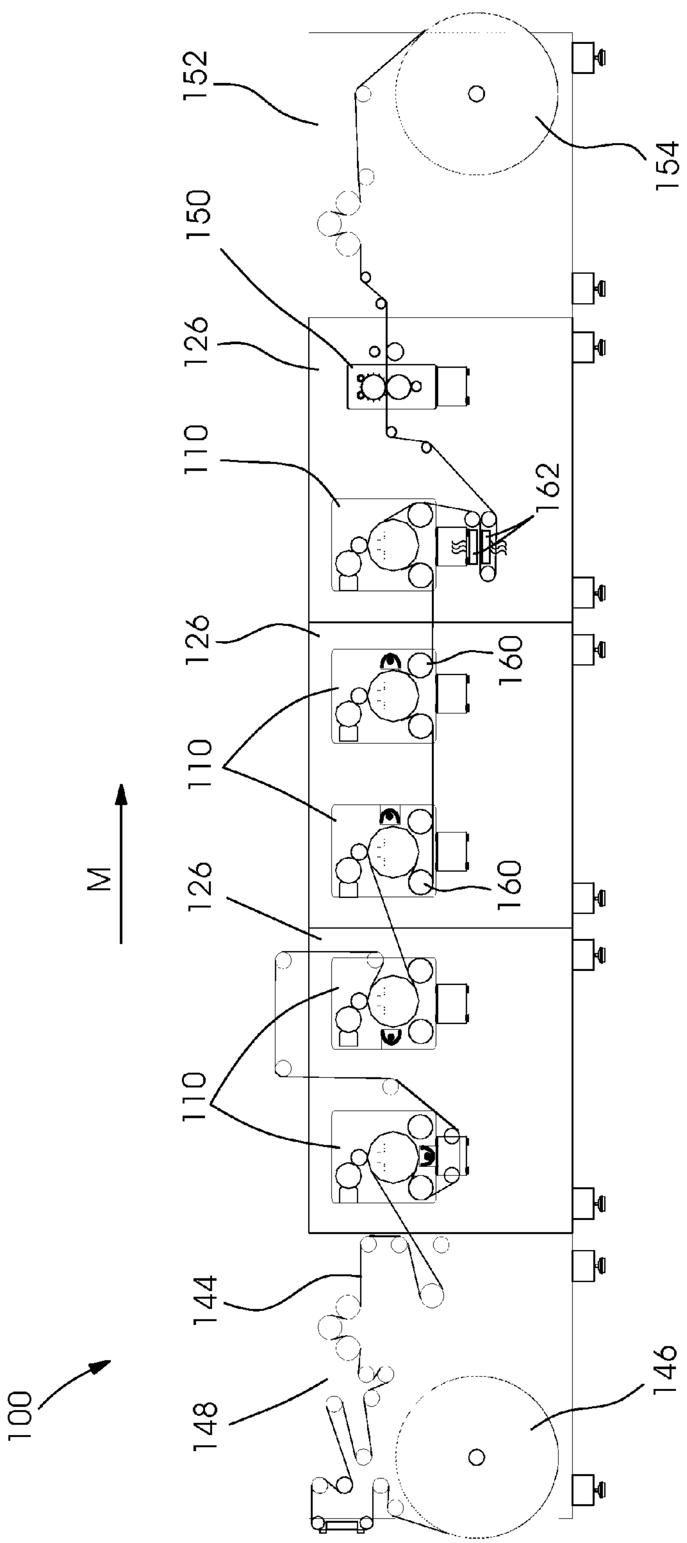
FIG. 4 is a diagrammatic, side view of a printing press that includes the die-cutting device according to the invention.

FIG. 4 illustrates a preferred embodiment of a printing press 100, in particular a narrow-web label printing press of in-line construction including printing units 110 succeeding each other in the horizontal direction. The label printing press is used to process a web-shaped substrate 144. The substrate is unwound from a substrate reel 146 in a feed section 148 of the printing press 142 and is guided through the press 142 along a path in a machine direction M. The press 142 may include a plurality of frame modules 126. In the illustrated example, three frame modules 126 are provided, each containing two respective printing units 110 or one printing unit 110 and one processing unit 150, in the present case a die-cutting unit for cutting the labels out of the web-shaped substrate 144. The individual processing units are followed by an exit part 152, in which the finished products are wound onto a label reel 154. Feed section 148, frame modules 126, and exit part 152 are releasably or separatably connected to each other. Thus the printing press 142 is of modular construction.

The individual printing units 110, which are configured as flexographic printing units in the given example, are shown to include chambered doctor blades in addition to the printing form cylinders, the impression cylinders, and the ink applicator rollers. Moreover, the printing units 110 of printing press 142 include various dryer devices: UV dryers for drying the printed substrate 144 directly on the impression cylinder are associated with the impression cylinders and are arranged downstream of the respective printing nip of the printing unit 110. The printing units 110 furthermore include web-guiding rollers 160 for guiding the web-shaped substrate 144. In the illustrated embodiment, the fifth printing unit 110 includes a hot-air dryer 162. Alternatively, a UV or an IR dryer may be used in this position, too. A die-cutting unit 150 is arranged downstream of the fifth printing unit. The die-cutting unit 150 includes a die-cutting cylinder and a counterpressure cylinder as rotating tools. Additionally or alternatively, an embossing or stamping unit, for instance a hot-foil stamping unit, may be provided.

Instead of the illustrated flexographic printing units, lithographic offset printing units or rotary screen printing units may be used.

The invention claimed is:

1. A die-cutting device, comprising:
- a die-cutting cylinder rotatable about an axis of rotation;
- a guide; and
- a counterpressure cylinder rotatable about an axis of rotation being generally parallel to said axis of rotation of said die-cutting cylinder, a distance between said die-cutting cylinder and said counterpressure cylinder being adjustable, by a locking force locking said die-cutting cylinder in position and said counterpressure cylinder being displaceably supported in said guide for adjusting the distance, the locking force and said guide generally forming a right angle with each other.

2. The die-cutting device according to claim 1, further comprising a further guide supporting said die-cutting cylinder, said guide of said counterpressure cylinder and said further guide of said die-cutting cylinder generally form a right angle with each other.

3. The die-cutting device according to claim 1, wherein said guide of said counterpressure cylinder is a horizontal guide.

4. The die-cutting device according to claim 2, wherein said further guide of said die-cutting cylinder is a vertical guide.

5. The die-cutting device according to claim 2, wherein at least one of said guide and said further guide includes guide rails.

6. The die-cutting device according to claim 2, further comprising at least one drive for displacing said counterpressure cylinder.

7. The die-cutting device according to claim 6, wherein said drive is suitable for fine-adjusting said counterpressure cylinder.

8. The die-cutting device according to claim 6, wherein said drive is suitable for a quick-acting disengagement of said counterpressure cylinder.

9. The die-cutting device according to claim 6, wherein said drive is suitable for adjusting a register of said die-cutting cylinder and of said counterpressure cylinder.

10. The die-cutting device according to claim 1, wherein the die-cutting device die-cuts labels.

11. A narrow-web printing press, comprising:
- a die-cutting device, containing:
  - a die-cutting cylinder rotatable about an axis of rotation;
  - a guide; and
  - a counterpressure cylinder rotatable about an axis of rotation being generally parallel to said axis of rotation of said die-cutting cylinder, a distance between said die-cutting cylinder and said counterpressure cylinder being adjustable, by a locking force locking said die-cutting cylinder in position and said counterpressure cylinder being displaceably supported in said guide for adjusting the distance, the locking force and said guide generally forming a right angle with each other.

12. The narrow-web printing press according to claim 11, wherein the narrow-web printing press is a label printing press.

* * * * *

UNITED STATES PATENT AND TRADEMARK OFFICE
CERTIFICATE OF CORRECTION

PATENT NO. : 8,943,939 B2
APPLICATION NO. : 13/557599
DATED : February 3, 2015
INVENTOR(S) : Thomas Demand It is certified that error appears in the above-identified patent and that said Letters Patent is hereby corrected as shown below:

On the title page item (73), should read:

Assignee: Gallus Druckmaschinen GmbH, Langgoens-Oberkleen (DE)

Signed and Sealed this
Twentieth Day of October, 2015

Michelle K. Lee
*Director of the United States Patent and Trademark Office*